July 16, 1940.  T. K. WALMA  2,208,315
BREAD SLICER
Filed Feb. 7, 1939  4 Sheets-Sheet 1

INVENTOR.
T. K. WALMA
BY
ATTORNEYS.

July 16, 1940.
T. K. WALMA
2,208,315
BREAD SLICER
Filed Feb. 7, 1939
4 Sheets-Sheet 2
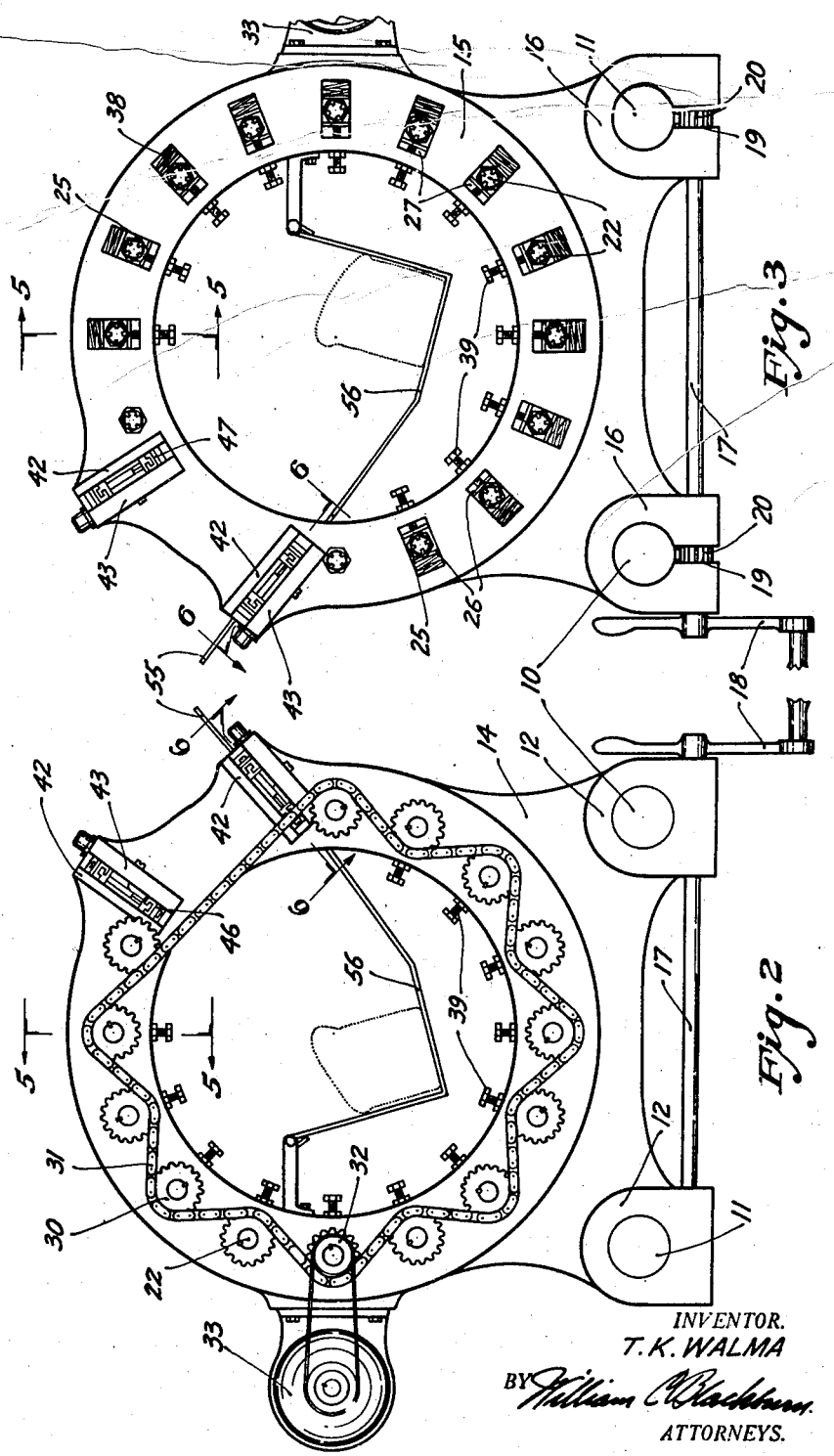
INVENTOR.
T. K. WALMA
BY
ATTORNEYS.

July 16, 1940.  T. K. WALMA  2,208,315
BREAD SLICER
Filed Feb. 7, 1939  4 Sheets-Sheet 3

INVENTOR.
T. K. WALMA
BY *William A Blackburn*
ATTORNEYS.

July 16, 1940.  T. K. WALMA  2,208,315
BREAD SLICER
Filed Feb. 7, 1939  4 Sheets-Sheet 4

INVENTOR.
T. K. WALMA
BY
ATTORNEYS.

Patented July 16, 1940

2,208,315

UNITED STATES PATENT OFFICE 2,208,315

BREAD SLICER

Theodore K. Walma, Iowa City, Iowa

Application February 7, 1939, Serial No. 254,999

14 Claims. (Cl. 146—96)

The present invention relates to the art of bread slicing machines and particularly to high speed slicing machines. Bread slicing machines at present in use are of two general types, first, the reciprocating blade type and, second, the "band saw" type. The first of these types slices the bread satisfactorily but is objectionable due to the machine being slow. Thus, there is in practice a practical top limit to the speed of operation due to the necessity of overcoming the inertia of the reciprocating portions. The second or band saw type is a substantial improvement over the first type as the moving portions do not start and stop and, therefore, the blades may be driven at a higher speed. In practice, however, difficulties are encountered in high speed operation. Breakage occurs at or adjacent the weld which is present in each of the endless blades, the breakage being due to flexing of the blades. Also, this type of machine is of considerable size, resulting in high initial cost and necessitating considerable space for the machine.

It is accordingly an object of this invention to provide a multiple slicing machine having continuously moving slicing blades which are not flexed during operation. A further object is to provide a bread slicing machine having endless blades which may be produced without welding. A yet further object of this invention is to provide a machine of the described type in which the spacing between the blades is adjustable.

In accordance with the present invention, a plurality of planar annular blades are arranged to rotate on their axes, all of which are parallel, and means are provided to guide an article to be sliced from one position to another, one position being within said blades and the other position being exterior of said blades.

Other objects and advantages of this invention and the nature thereof will be apparent from a consideration of the following description taken in conjunction with the accompanying drawings which illustrate a specific embodiment of the invention.

In the accompanying drawings:

Fig. 2 is a left end elevation of the machine shown in Fig. 1;

Fig. 3 is a right hand elevation of the machine shown in Fig. 1;

In Fig. 6, the blades are shown positioned at their maximum spacing;

Figure 1:
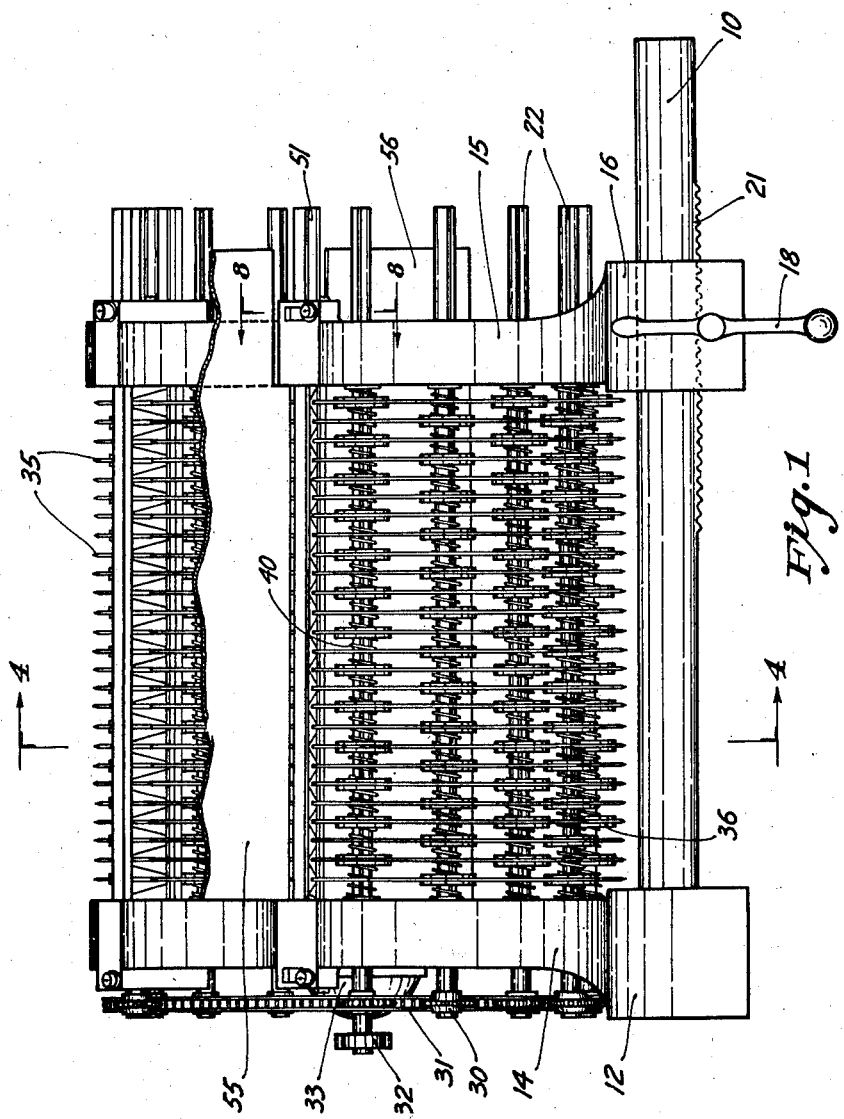
Fig. 1 is an elevation of a bread slicing machine in accord with this invention, a portion of the bread guide being broken away better to show the vernier blade-spacing device.
Figure 4:
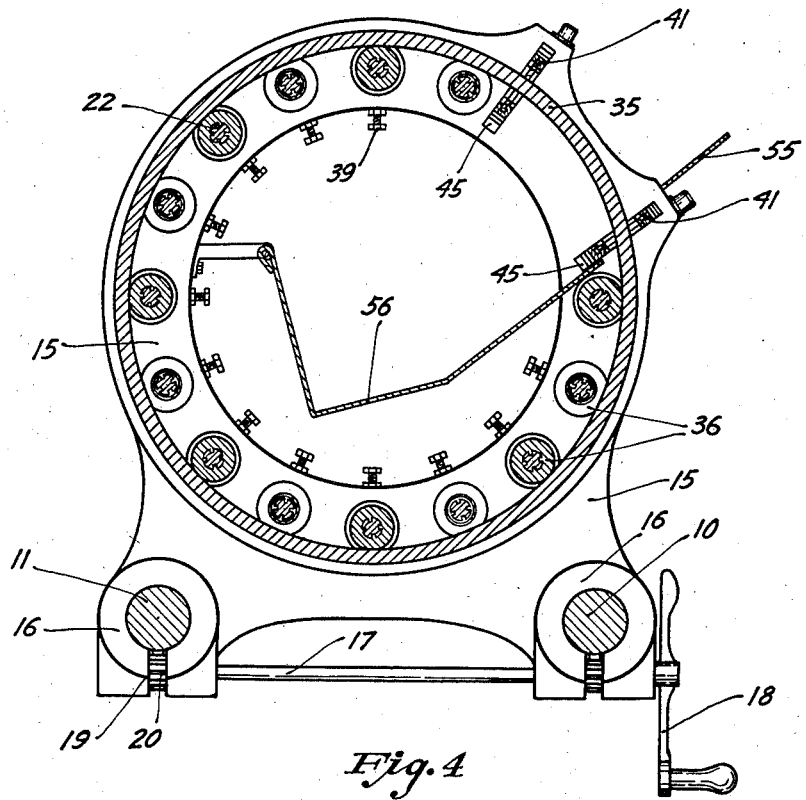
Fig. 4 is a vertical section substantially on the line 4—4 in Fig. 1.
Figure 5:
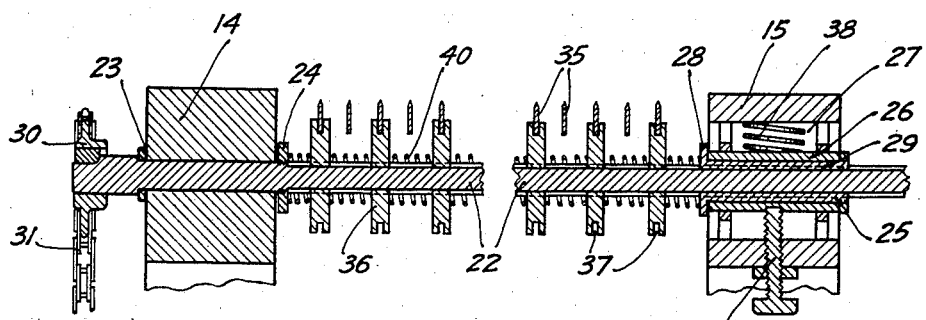
Fig. 5 is a broken detail section of the machine through one of the blade-supporting shafts and through the frame-plates at the ends of the machine, the section being taken substantially on the line 5—5 in Figs. 2 and 3.

The machine shown in the drawings involves a pair of frame shafts 10 and 11, each of which is fixed in one of a pair of sleeves 12 in the frame plate 14 at the left end of the machine. A second frame plate 15 is arranged to slide on the shafts, the plate being provided with collars 16 which engage the shafts. A shaft 17 extends through both of the collars 16 below the shafts 10 and 11 and has secured to its forward end a crank 18 whereby the shaft 17 may be turned. Each of sleeves 16 is provided with an opening 19 positioned radially of the shafts 10 and 11, with the shaft 17 extending through the openings 19. A gear 20 is positioned in each of the openings 19 and is keyed on shaft 17 to rotate with crank 18. Each of shafts 10 and 11 is provided with a rack 21, engaging the respective gear 20 whereby, upon actuation of the crank 18, the frame plate 15 will be reciprocated along the frame shafts.

Each of the frame plates 14, 15 is in the form of an annular ring arranged to carry a plurality of shafts 22 in a cylindrical cage arrangement. The shafts 22 are rotatable in bearings in the frame plates. Each of shafts 22 is provided, near its left end, with a shoulder facing the right end of the machine, with which shoulder a thrust bearing 23 engages. These bearings 23 also engage the outer surface of the frame plate 14. A second thrust bearing 24 threadedly engages each shaft 22 immediately within the frame plate 14 to prevent movement of the shafts to the left. At the right end of each shaft 22, which shafts are splined from bearings 24 to their extreme right ends, a sleeve-shaped journal 25 is provided on each shaft, which journal is internally splined to engage and slide on the shafts. The journals 25 are rotatably carried by bearings 26 which are slidably received in radial openings 27. The journals are provided with a flange 28 at their inner ends and with a threadedly engaging thrust bearing 29 at their outer ends.

Outside of the left frame plate 14, each of shafts 22 has keyed thereto a sprocket 30, all of the sprockets having the same number of teeth. An endless drive chain 31 engages alternate sprockets on the outside and each of the intervening sprockets on the inside so that adjacent shafts are driven in opposite directions. On the left end of one of the shafts, a pulley 32 is also secured, non-rotatably, as by a key, a motor 33 being provided, having a pulley belted to the pulley 32.

A series of flat or planar annular blades 35 is positioned about the shafts with the shafts extending through the openings in the blades. Rollers 36 are provided which are internally splined and engage the splines on the shafts whereby the rollers are constrained to rotate with the shafts. The rollers 36 are provided with circumferential grooves 37 to receive the slicing blades. The rollers on any one shaft engage alternate blades of the series while the rollers on the shafts adjacent thereto engage the blades intermediate said alternate blades. Due to this arrangement of rollers and as adjacent shafts are driven in opposite directions, all adjacent blades are driven in opposite directions.

While for drafting convenience the blades have been shown as straight edge blades, it is to be understood that any suitable edge may be formed on the blades, such as the well known scallop edge.

The floating bearings, heretofore described and located in the right frame plate, are provided with a spring 38 to move the bearing inwardly and with a bolt 39 which threadedly engages the right frame plate and bears against the bearing to force the bearing outward. By this arrangement, the tension on the shafts may be relieved at the right end to facilitate the removal of the blades from the shafts 22.

Guide means are provided for spacing the rollers and thereby the blades in relatively proportionate positions along the length of the machine. Rough control of the position of the main portion of each blade is provided by positioning a spring 40 between all adjacent rollers on each shaft and between each end roller and the frame plates. All the springs on any particular shaft are of substantially the same strength whereby movement of the right frame plate effects movement of the rollers along the shaft whereby to maintain equal spacing between adjacent blades. The proportionate spacing may be varied by the use of springs of various strengths.

At the upper part of the front side of the slicer there is allowed a sufficient gap between adjacent shafts to accommodate vernier spacing controls 41 to be positioned in the gap adjacent each of the shafts and to allow the passage of a loaf of bread between these controls. These vernier controls 41 involve a pair of guides 42, 43 in each frame member adjacent an opening 44, 45. A pair of slides 46, 47 is arranged in each pair of guides and threadedly engage a left and right hand threaded bolt 48. Between the opposed threads on the bolts, a grooved flange 49 is positioned in which a pin 50 fixed in one of the guides engages, whereby turning of the bolt effects adjustment of the slides to variable equal distances from a fixed center. A pair of rods 51 extend through the openings 44, 45, the rods being fixed as by bolts 52 in the slides 46 carried by the left frame plate 14.

Each of the rods is formed to carry a plurality of wedges 53 slidable therealong, and the engaging portions of the rods and wedges are preferably formed to slidably interlock. Thus, sliding dovetail connections may be made along the edges of adjacent wedges, whereby the wedges when assembled are not only held in a single plane but also interlock so that they may not separate if pressure is released on the end of the series of wedges. Such an arrangement is of assistance not only in assembling and disassembling a machine but also makes possible the use of the vernier controls for drawing the blades together.

Figure 6:
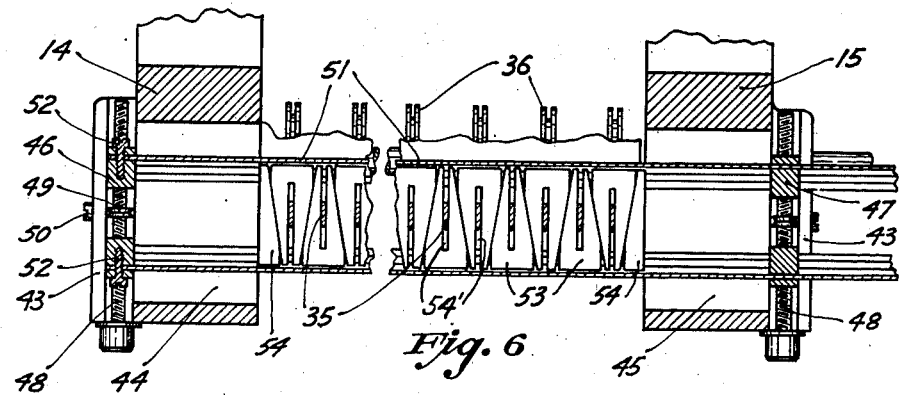
Fig. 6 is a broken section showing in detail the vernier blade spacing mechanism, the section being substantially on the plane of the line 6—6 in Figs. 2 and 3.
Figures 7, 10:
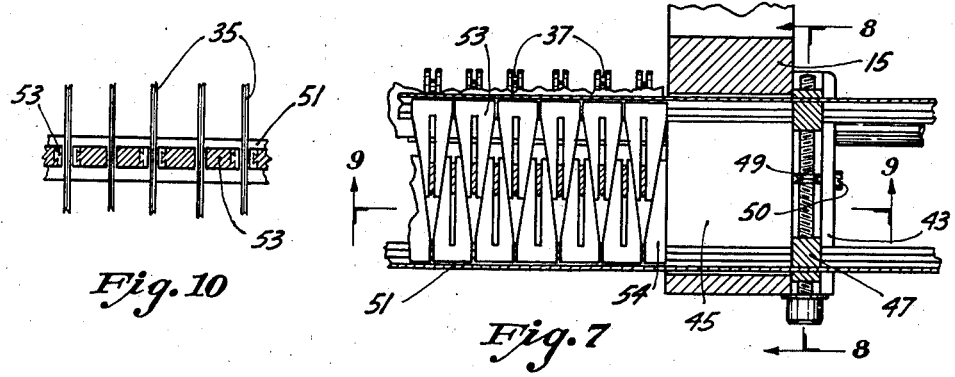
Fig. 7 is a fragmentary section similar to Fig. 6 showing the blades in a proximal position.
Fig. 10 is a fragmentary detail section on the plane of the line 9—9 in Figs. 7 and 8 showing the blades and the vernier spacing mechanism.
Figures 8, 9:
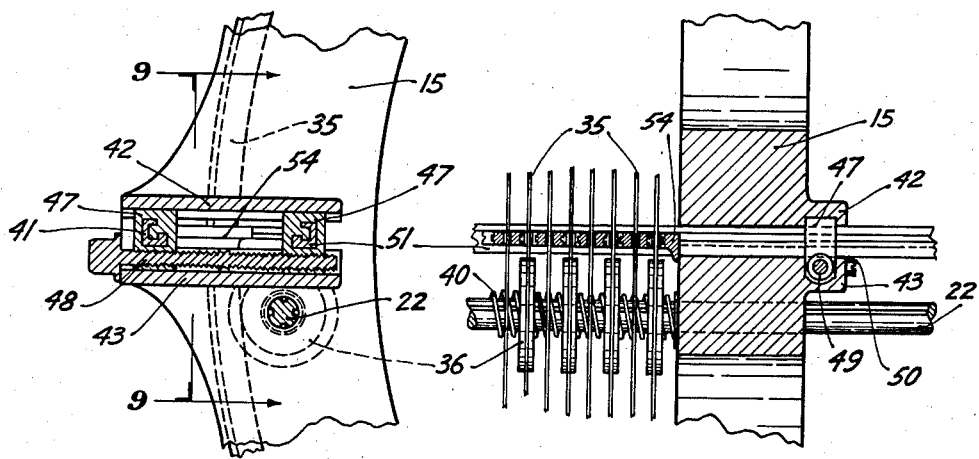
Fig. 8 is a section through the control means of the vernier spacing mechanism substantially on the line 8—8 in Figs. 1 and 7.
Fig. 9 is a section on the plane of the line 9—9 in Figs. 7 and 8.

The rods 51 are arranged with one rod inside the series of blades and the other rod outside the blades. The wedges carried by one of the rods engage alternate blades, and those carried by the other rod engage the blades intermediate therebetween. One set of wedges have male dovetail edges, and the other set engaging therewith have complemental edges, as illustrated in Fig. 9. The wedges are each provided with a slot 54' through which one of the blades moves, whereby the blades are guided by the wedge system. As the end of each wedge engaging the rod 51 is wider than the free end of the wedge, when the rods are in the position shown in Fig. 6, wherein the rods are in their proximal position, the blades are positioned at their maximum spacing. When the rods are moved apart, as shown in Fig. 7, the machine may be moved to a closed position, in which the blades are in their position of minimum spacing. As the only line of continuous contact in the wedge system is along the lines of the blades, to exert pressure at the ends of the wedges, and thereby position the system properly with respect to the machine, a wedge 54 is employed having a side perpendicular to the axis of the machine to bear against the frame plate. This wedge may either be a blank, as shown, or may be a blade-guiding wedge. In the latter case, collars would be substituted for the springs 40, spacing the last blade of the series from the frame plate.

A bread guide 55 is arranged exteriorly of the aforementioned gap between shafts 22, at an elevation and angle to guide bread to the lower vernier control 41. This lower control functions to guide the bread through the blades. A second guide 56 is positioned within the blades to receive sliced bread from the blades, the guide 56 being provided with an angularly related stop wall forming a channel along which the bread may be reciprocated by conventional means timed with respect to the delivery of bread to the slicer, considering the speed of slicing, and timed with respect to a wrapping machine which receives bread from the slicer. As such means constitute no part of the present invention, no specific disclosure thereof is here made. The bread guide is arranged to guide the bread in a direction at all times perpendicular to a plane through the axis of at least one of the blades.

The bread guide, as shown, may be employed to feed the bread by gravity to the blades. However, if desired, a chain feed or other well known feed may be employed.

The blades are preferably of sufficient width in relation to the gap between the vernier controls that a line between the intersection of the outer edge of the blades and the vernier controls lies entirely within the body of the blades and does not extend through the openings therethrough.

In operation, with the machine set to cut, for instance, minimum thickness slices, the motor 33 is started rotating. Through the belt and pulley 32, one of the shafts 22 is rotated. Rotation of this shaft causes rotation of all the other shafts 22, adjacent shafts being rotated in opposite directions, due to the positioning of drive chain 31. Rotation of the shafts 22 effects rotation of each of the rollers 36 splined on said shafts. As shown, each of the blades is supported and driven by rollers on a group of shafts comprising seven of the fourteen shafts, all blades supported by that group of shafts being driven in the same direction. The remaining blades are carried and driven by the group of shafts intermediate the stated group, these blades being driven in the opposite direction.

A loaf of bread or other material to be sliced may then be fed to the group of blades. As all adjacent blades rotate in opposite directions, deformation of the material being sliced is avoided. The sliced loaf may then be removed from the internal guide.

In case it is desired to change the thickness of the slices, the crank 18 and the bolts 48 which control the spacing of rods 51 may be turned, preferably substantially synchronously, either manually or by suitable interconnection. As the frame plate at the right end is moved to the right, the rods 51 should be moved together whereby the blades are spaced farther apart. Opposite movement of the two should be effected to reduce the spacing.

In case it is desired to remove the blades for sharpening or replacement, thrust bearings 29 are removed and the right frame plate is moved to the right, first reducing the tension on the blades by adjustment of the bolts 39. The blades may then be removed together with journals 25, rollers 36, springs 40, and wedges 53, while the frame plate is supported by frame shafts 10 and 11 spaced from the shafts 22.

While I have disclosed but a single embodiment of the present invention, it is to be understood that this invention is not limited thereto but only by the subjoined claims. Thus obvious modifications, such as placing the oppositely rotating blades on different axes, are clearly within the scope hereof.

Having now described my invention, I claim:

1. A bread-slicing machine comprising a plurality of planar annular cutting blades positioned in substantially parallel planes, a plurality of shafts positioned within said blades substantially perpendicular to said planes, a plurality of supporting rollers on each of said shafts, said rollers engaging alternate blades, a second plurality of shafts positioned at points intermediate the shafts of the first mentioned plurality of shafts, a plurality of supporting rollers on each of said second mentioned plurality of shafts arranged to engage and support the blades intermediate said alternate blades, means to rotate said alternate blades in one direction, and means to rotate the intermediate blades in the opposite direction.

2. A bread-slicing machine comprising a plurality of planar annular blades, means to support said blades in parallel positions for rotation of each blade about its axis, and means to guide a loaf of bread in movement from one position to another position with the movement of said loaf at all times perpendicular to a plane through one of said axes, one of said positions being within all of said blades and the other position external of all of said blades, the loaf of bread, when in said one of said positions, entirely within said blades, being movable transversely of the blades.

3. A bread-slicing machine comprising a plurality of planar annular blades, means to support said blades in parallel positions for rotation of each blade about its axis, means to guide a loaf of bread in movement from one position to another position with the movement of said loaf at all times perpendicular to a plane through one of said axes, one of said positions being within all of said blades and the other position external of all of said blades, and means to guide said blades to positions to maintain the relative proportional longitudinal spacing of said blades along said axes upon relative adjustment thereof along said axes, the loaves, when within the blades, being movable transversely thereof through the openings of the annuli.

4. A bread-slicing machine comprising a plurality of planar annular blades, means to support said blades in parallel positions for rotation of each blade about its axis, means to guide a loaf of bread in movement from one position to another position with the movement of said loaf at all times perpendicular to a plane through one of said axes, one of said positions being within all of said blades and the other position external of all of the blades, adjusting means to change the spacing of the end blades of said plurality in a direction perpendicular to the planes of said blades, and means to maintain the relative proportionate spacing of the plurality of blades in a direction perpendicular to the planes of said blades upon operation of said adjusting means.

5. A bread-slicing machine comprising a plurality of planar annular blades, means to support said blades in parallel positions for rotation of each blade about its axis, means to guide a loaf of bread in movement from one position to another position with the movement of said loaf at all times perpendicular to a plane through one of said axes, one of said positions being within all of said blades and the other position external of all of the blades, adjusting means to change the spacing of the end blades of said plurality in a direction perpendicular to the planes of said blades, and means to maintain the relative proportionate spacing of the plurality of blades in a direction perpendicular to the planes of said blades upon operation of said adjusting means, said last named means comprising a pair of guide rods and a plurality of wedge-shaped members slidable on each of said rods, the wedge-shaped members on each rod being in edge-to-edge engagement with a pair of wedge-shaped members on the other rod, said wedge-shaped members being severally provided with means to guide one of said blades, whereby adjustment of said rods, together and apart, increases and decreases respectively the overall extent of said members along the rods, thereby similarly guiding said blades.

6. A bread-slicing machine comprising a plurality of planar annular blades, means to support said blades for rotation, at least some of said blades rotating on a substantially common axis, means to effect rotation of said plurality of blades in opposite directions, and means to guide a loaf of bread from a position external of said plurality of blades in a direction perpendicular to a plane through said axis to a position wholly within the annuli of said plurality of blades.

7. A bread-slicing machine comprising a plurality of planar annular blades, means to support said blades for rotation, at least some of said blades rotating on a substantially common axis, said means supporting said blades for relative adjustment along said axis, means to effect rotation of said plurality of blades, said last named means causing alternate blades to rotate in opposite directions, and means to guide a loaf of bread from a position external of said plurality of blades in a direction perpendicular to a plane through said axis to a position wholly within the annuli of said plurality of blades for motion substantially perpendicular to the planes of said blades.

8. A bread-slicing machine comprising three or more planar annular blades, means to support said blades for rotation, at least some of said blades rotating on a substantially common axis, said means supporting said blades for relative adjustment along said axis, means to effect rotation of said plurality of blades, and means to guide a loaf of bread from a position external of said plurality of blades, in a direction perpendicular to said axis, to a position wholly within the peripheries of said plurality of blades, the openings in the annular blades being sufficiently large that the bread in the second position will be entirely free from said blades for motion through said blades, and means to guide said blades to maintain the relative proportional longitudinal spacing of said blades along said axis upon relative adjustment thereof along said axis.

9. A bread-slicing machine comprising a plurality of planar annular blades arranged substantially coaxially, a plurality of shafts arranged within said blades substantially parallel to said axis, a plurality of guide rollers slidably arranged on each of said shafts and in guiding engagement with at least some of said plurality of blades, and a spring arranged between each pair of adjacent rollers on at least one of said shafts and in engagement with said adjacent rollers whereby to maintain the relative proportionate spacing between each pair of adjacent blades upon change of the overall extent of said blades.

10. In a bread-slicing machine comprising a pair of frame plates, means to support said plates in parallel positions and for relative movement in a direction perpendicular to the planes of said plates, a plurality of shafts, each of which is carried in bearings in both frame plates, the shafts being parallel to and substantially equally spaced from an axis perpendicular to said frame plates, the bearings of at least some of said shafts in at least one of said plates being adjustable toward and from said axis, a plurality of guide rollers slidably and non-rotatably positioned on each of said shafts, and a plurality of planar annular blades carried by said rollers for rotation about said axis and for adjustment therealong.

11. In a bread-slicing machine comprising a pair of frame plates, means to support said plates in parallel positions and for relative movement in a direction perpendicular to the planes of said plates, a plurality of shafts, each of which is carried in bearings in both frame plates, the shafts being parallel to and substantially equally spaced from an axis perpendicular to said frame plates, a plurality of guide rollers slidably and non-rotatably positioned on each of said shafts, and a plurality of annular blades carried by said rollers for rotation about said axis and for adjustment therealong.

12. A plural cutting machine comprising at least three planar annular blades having unobstructed centers means to support said blades bearing against their inner peripheries for rotation, at least some of said blades rotating on a substantially common axis, said means being movable along said axis and supporting said blades for relative adjustment along said axis, means to effect rotation of said plurality of blades, means to guide work to be cut from a position external of said plurality of blades in a direction perpendicular to a plane through said axis to a position entirely within the annuli of said plurality of blades, and means to guide said blades to maintain the relative proportional longitudinal spacing of said blades along said axis upon relative adjustment thereof along said axis.

13. A machine for cutting a plurality of slices of substantially equal thickness comprising a series of planar annular blades having unobstructed centers to receive the sliced material and permit the passage thereof through the blades transversely to the planes of the blades, means to support the blades by their inner peripheries and cause them to rotate, and means to proportionally increase or decrease the spacing of said blades.

14. A machine for cutting a plurality of slices of predetermined and proportionally variable thickness comprising a series of planar annular blades having their cutting edges along their outer peripheries, the space within the central portion of the annuli being unobstructed to permit the sliced material to pass through the blades transversely to the planes thereof, means within the annuli engaging the inner peripheries of the annuli to support the blades and rotate them about a fixed axis, and means to proportionally increase and decrease the spacing of said blades.

THEODORE K. WALMA.